(12) United States Patent
Kim et al.

(10) Patent No.: US 8,888,134 B2
(45) Date of Patent: Nov. 18, 2014

(54) MOUNTING UNIT FOR SUB-FRAME IN VEHICLE

(71) Applicants: Hyundai Motor Company, Seoul (KR); Kia Motor Corporation, Seoul (KR); Shin Young Co., Ltd., Yeongcheon (KR); Sungwoo Hitech Co., Ltd., Busan (KR); MS Autotech Co., Ltd., Gyeongju (KR)

(72) Inventors: Dae Seung Kim, Gwacheon-si (KR); Chang Wook Park, Suwon-si (KR); Jang-Su Kim, Gyeongju-si (KR); Mun Yong Lee, Busan (KR); Sungyong Park, Suwon-si (KR); Daeho Yang, Hwaseong-si (KR); Dae Keun Kim, Suwon-si (KR); Sang Hoon Chae, Hwaseong-si (KR); Sang-Lae Lee, Ulsan (KR)

(73) Assignees: Hyundai Motor Company, Seoul (KR); Kia Motors Corporation, Seoul (KR); Shin Young Co., Ltd., Yeongcheon-Si, Gyeongsangbuk-Do (KR); Sungwoo Hitech Co., Ltd., Busan (KR); MS Autotech Co., Ltd., Gyeongju-Si, Gyeongsangbuk-Do (KR)

( * ) Notice: Subject to any disclaimer, the term of this patent is extended or adjusted under 35 U.S.C. 154(b) by 0 days.

(21) Appl. No.: 14/067,837

(22) Filed: Oct. 30, 2013

(65) Prior Publication Data

US 2014/0159411 A1 Jun. 12, 2014

(30) Foreign Application Priority Data

Dec. 10, 2012 (KR) ........................ 10-2012-0143095

(51) Int. Cl.
*B62D 21/02* (2006.01)
*B62D 25/08* (2006.01)
*B62D 27/06* (2006.01)
*B62D 21/11* (2006.01)

(52) U.S. Cl.
CPC .............. *B62D 21/11* (2013.01); *B62D 25/082* (2013.01); *B62D 27/065* (2013.01)
USPC ....... 280/781; 296/29; 296/35.1; 296/193.09; 180/299

(58) Field of Classification Search
CPC ........ B62D 21/02; B62D 21/09; B62D 21/11; B62D 27/065; B60G 2206/60; B60G 2206/601
USPC .............. 280/781, 784; 296/29, 35.1, 187.09, 296/193.09, 203.02; 180/291, 299
See application file for complete search history.

(56) References Cited

U.S. PATENT DOCUMENTS

6,293,364 B1 * 9/2001 Anderson et al. ............. 180/312
7,726,718 B2 * 6/2010 Weirup ........................... 296/30
(Continued)

*Primary Examiner* — Joseph M Rocca
*Assistant Examiner* — Darlene P Condra
(74) *Attorney, Agent, or Firm* — McDermott Will & Emery LLP (57) ABSTRACT

A mounting unit for a sub-frame of a vehicle is provided. The mounting unit is used for engaging a front side member with the vehicle's sub-frame. The mounting unit includes a welding seat that is formed as a groove on a lower side of the front side member. The mounting unit further includes a mounting nut assembled with the front side member, a welding flange integrated with an external circumference and a head of the mounting nut and inserted into the welding seat to be combined with the welding seat, and a member seat that is formed outside the welding flange and with which a fender upper connecting member is combined.

9 Claims, 6 Drawing Sheets

(56) References Cited

U.S. PATENT DOCUMENTS

| | | |
|---|---|---|
| 2003/0025359 A1* | 2/2003 | Takahashi et al. ....... 296/203.02 |
| 2004/0046381 A1* | 3/2004 | Yoshida et al. ............... 280/784 |
| 2005/0200093 A1* | 9/2005 | Komiya ................. 280/124.109 |
| 2006/0197300 A1* | 9/2006 | Nakashima et al. ... 280/124.109 |
| 2010/0231006 A1* | 9/2010 | Okabe et al. ............. 296/203.02 |
| 2011/0133520 A1* | 6/2011 | Kondou et al. ................ 296/204 |
| 2012/0175900 A1* | 7/2012 | Rawlinson .................... 293/132 |
| 2012/0248820 A1* | 10/2012 | Yasui et al. .............. 296/187.09 |

* cited by examiner

MOUNTING UNIT FOR SUB-FRAME IN VEHICLE

CROSS-REFERENCE TO RELATED APPLICATION

This application claims priority to and the benefit of Korean Patent Application No. 10-2012-0143095 filed in the Korean Intellectual Property Office on Dec. 10, 2012, the entire contents of which are incorporated herein by reference.

BACKGROUND (a) Field

The present disclosure relates to mounting units for vehicle sub-frames.

(b) Description of the Related Art

In general, a front sub-frame (hereinafter, simply referred to as a sub-frame) of a vehicle mounts power train parts such as an engine and a transmission in a monocoque vehicle body structure.

Figure 1:
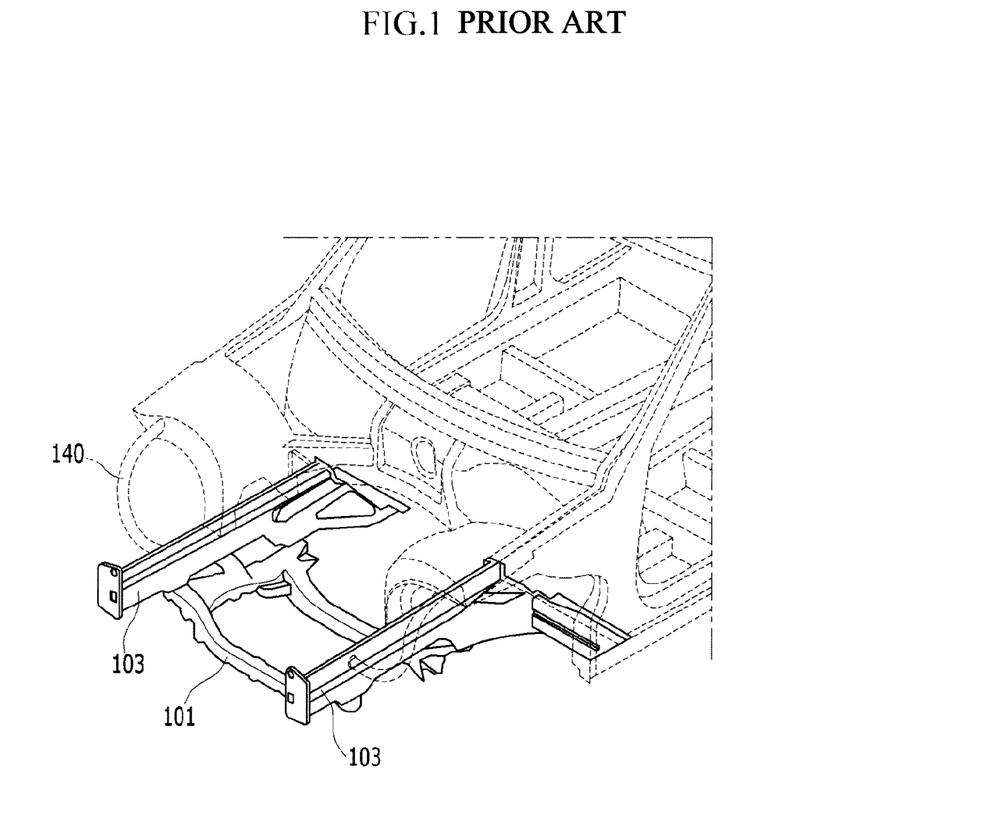
FIG. 1 is a perspective view of an assembly state of a common front side member and a sub-frame.

FIG. 1 illustrates a perspective view of an assembly between a common side member and a sub-frame.

As shown in the example of FIG. 1, a sub-frame 101 is combined with a lower part of a front side member (hereinafter, simply referred to as a side member) 103 on both sides of a vehicle body through a mounting unit, as will be discussed below in reference to FIGS. 2 and 3.

As the sub-frame 101 is used for mounting and supporting power trains of a vehicle, a large load is continuously applied to the sub-frame 101 during the operation of the vehicle (e.g., while the vehicle is driven). Accordingly, the mounting unit must connect the side member 103 of the vehicle body to the sub-frame 101 so that they are firmly combined with each other.

Figure 2:
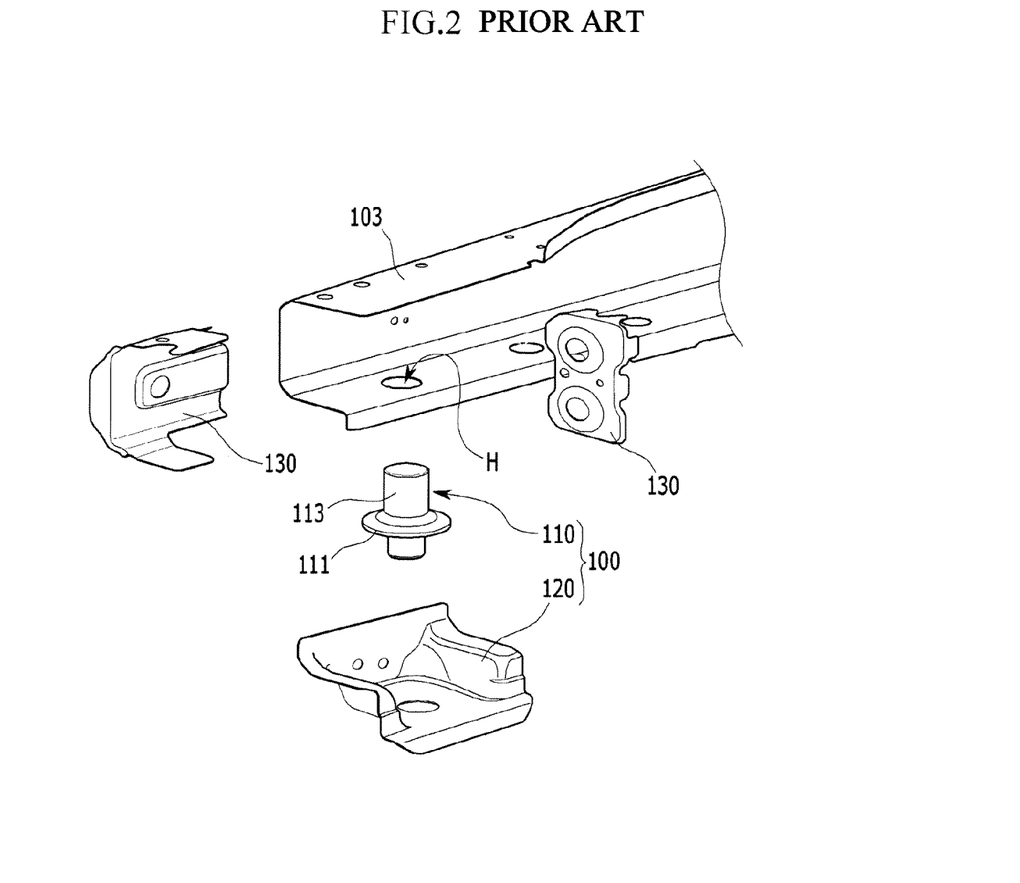
FIG. 2 is an exploded perspective view of an assembly unit including a conventional mounting unit for a sub-frame.

FIG. 2 shows an exploded perspective view of an assembly unit of a side member to which a conventional mounting unit is applied. FIG. 3 is a perspective view of an assembly unit of a side member to which a conventional mounting unit is applied.

Figure 3:
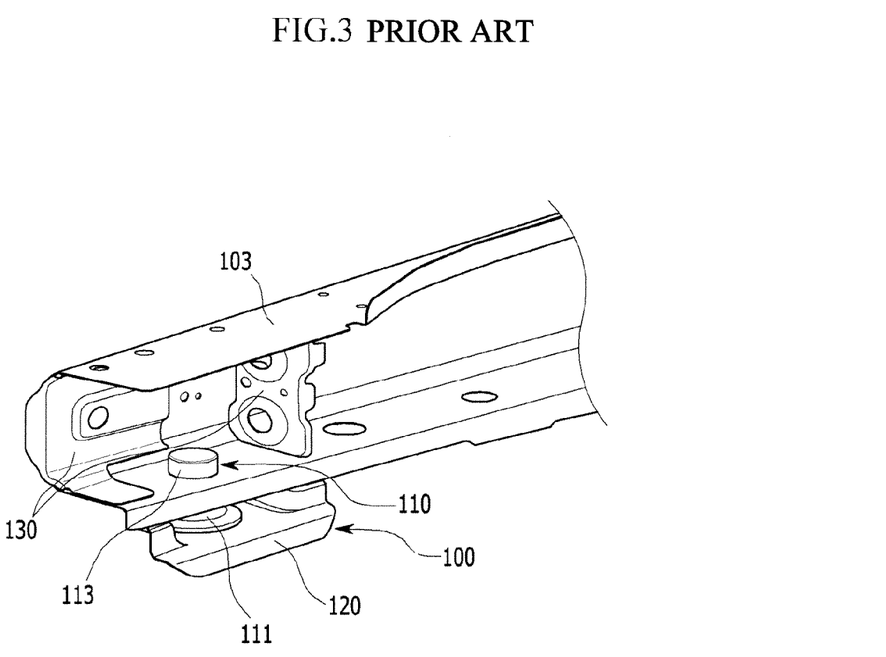
FIG. 3 is a perspective view of an assembly unit including a conventional mounting unit for a sub-frame.

In particular, FIGS. 2 and 3 illustrate an exemplary mounting unit 100 for engaging the sub-frame 101 with the side member 103 of FIG. 1. As shown in FIG. 2, the mounting unit 100 may be assembled by connecting a supporting end 111 of a mounting nut 110 with a bracket 120. In this example, a head 113 of the mounting nut 110 may then be welded to the side member 103 after the head 113 is inserted into a through hole H formed in a lower surface of the side member 103.

For example, the mounting nut 110 may be assembled with the bracket 120 and the side member 103 by arc welding or combined with the bracket 120 and the side member 103 by spot welding.

The range of motion of the mounting unit 100 must be restricted in order to suppress any excessive movement that would prevent the side member 103 from being firmly combined with the sub-frame 101. The mounting unit 100 has the following supporting structure.

In this example, the supporting structure of the mounting unit 100 includes a circular supporting end 111 in a central portion of the mounting nut 110 for combining the mounting nut 110 with the bracket 120. The head 113 of the mounting nut 110 and a periphery of the through hole H of the side member 103 are also combined with each other so that the degree of freedom of motion of the mounting nut 110 is suppressed.

The degree of freedom of motion of the mounting unit 110 is further suppressed by increasing the amount of stiffness between the bracket 120 and the side member 103, as they are combined with the mounting nut 110.

In such a supporting structure, a greater amount of stiffness may be required, as numerous vehicle body parts must be installed around a single joint of the mounting unit 100. Accordingly, the amount of stiffness may be increased by applying an additional reinforcing member 130, as shown in FIG. 2.

Vertical stiffness around the joint of the mounting unit 100 may be secured by applying the reinforcing member 130. However, there may be various limitations on increasing stiffness to suppress movement in a horizontal direction, also referred to herein as back and forth or side to side supporting stiffness.

In particular, as shown in FIG. 1, a fender upper connecting member 140 may be installed so as to be connected to a vehicle body fender in a periphery of the side member 103 in which the mounting unit 100 is provided. This requires additional back and forth and side to side supporting stiffness for the periphery of the side member 103.

The above information disclosed in this Background section is only for enhancement of understanding of the background of the present disclosure and therefore it may include information that may not considered prior art that would have been known to a person of ordinary skill in the relevant art.

SUMMARY

In accordance with an aspect of the present disclosure, a mounting unit for a sub-frame in which a welding joint is enlarged in a state where the mounting nut is laterally inserted on a lower side of a side member so that a supporting structure that is firm or rigid in vertical (up and down) and horizontal (back and forth) directions is formed. A member seat is formed outside the mounting nut so that one end of a fender upper connecting member is connected to the member seat so that a supporting structure that is firm side to side may be formed.

In another aspect of the present disclosure, a welding seat that acts as a groove is formed on a lower side of the front side member within a mounting unit for a sub-frame for engaging a front side member and a sub-frame of a vehicle. The mounting unit may include a mounting nut assembled with the front side member, a welding flange integrated with an external circumference and a head of the mounting nut and inserted into the welding seat to be combined with the welding seat, and a member seat that is formed outside the welding flange and with which a fender upper connecting member is combined.

The welding seat may include a horizontal welding seat formed along an internal end of a groove by which one side of a lower surface of the front side member is cut and a vertical welding seat formed along an internal end of a groove by which one side of an external surface of the front side member is cut.

The welding flange may include a horizontal flange formed along an external circumference of the mounting nut to be combined with a horizontal welding seat of the front side member and a vertical flange formed on both sides of a head of the mounting nut in a vertical direction to be combined with a vertical welding seat of the front side member.

The member seat may be formed of a seat flange in which a member seat that is integrated with an external upper surface of the welding flange and with which one end of the fender upper connecting member is combined is engraved.

The seat flange may be connected to the welding flange through a rib integrated between the seat flange and the welding flange.

The combination may be performed by arc welding.

The combination may be performed by line welding along circumferences of the welding seat and the welding flange and circumferences of the member seat and one end of the fender upper connecting member.

The front side member may be formed by a multiplanar aluminum extrusion molding beam.

The mounting nut, the welding flange, and the member seat may be integrated with each other by aluminum die-casting molding in the mounting unit.

According to the exemplary embodiment of the present disclosure, the welding joint is enlarged in a state where the mounting nut is laterally inserted on a lower side of the side member so that the supporting structure that is firm up and down and back and forth may be formed.

In addition, the member seat is disposed on an exterior portion of the mounting nut and one end of the fender upper connecting member is connected to the member seat so that the supporting structure that is firm side to side may be formed.

In addition, the additional bracket may be removed so that weight lightening may be performed and cost may be reduced.

DETAILED DESCRIPTION

The present disclosure will be described herein using exemplary embodiments with reference to the accompanying drawings.

It should be noted that the present disclosure is not limited to the exemplary embodiments described herein, and that these embodiments may include additional components, which have been omitted for ease of explanation and clarification of features that are more directly related to the devices and techniques disclosed herein.

Figure 4:
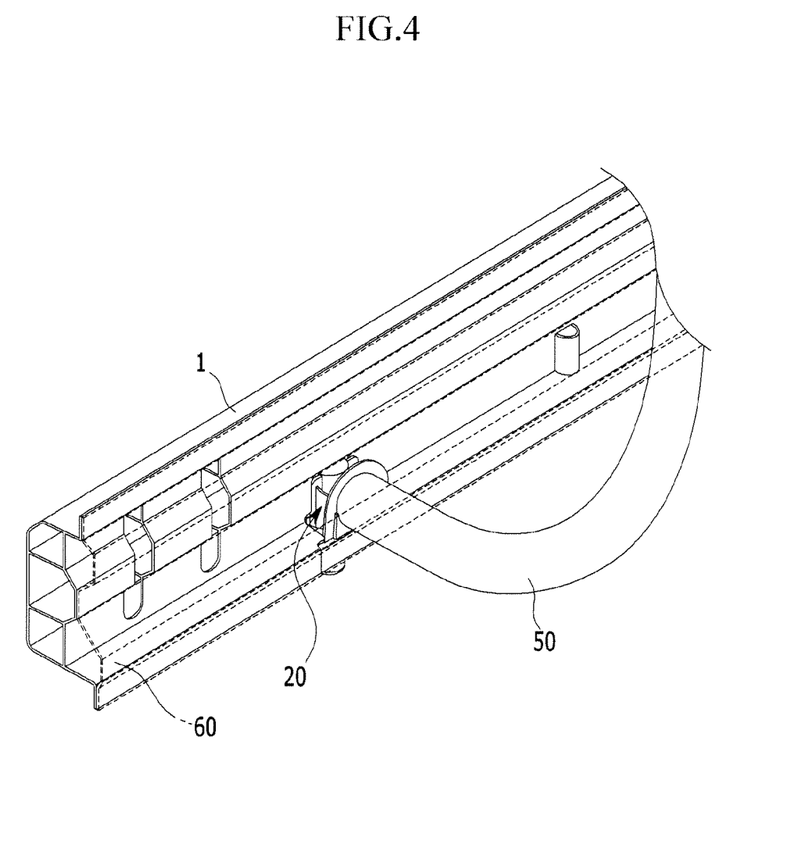
FIG. 4 is a projection perspective view of a side member assembly unit to which a mounting unit is applied.
Figure 5:
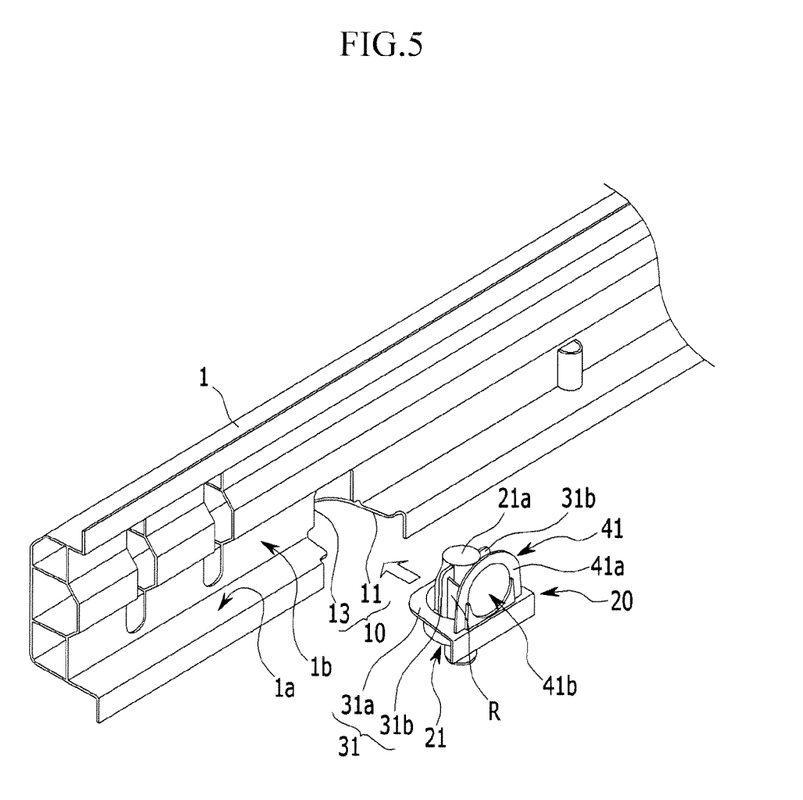
FIG. 5 is an exploded perspective view of a side member assembly unit to which a mounting unit is applied.
Figure 6:
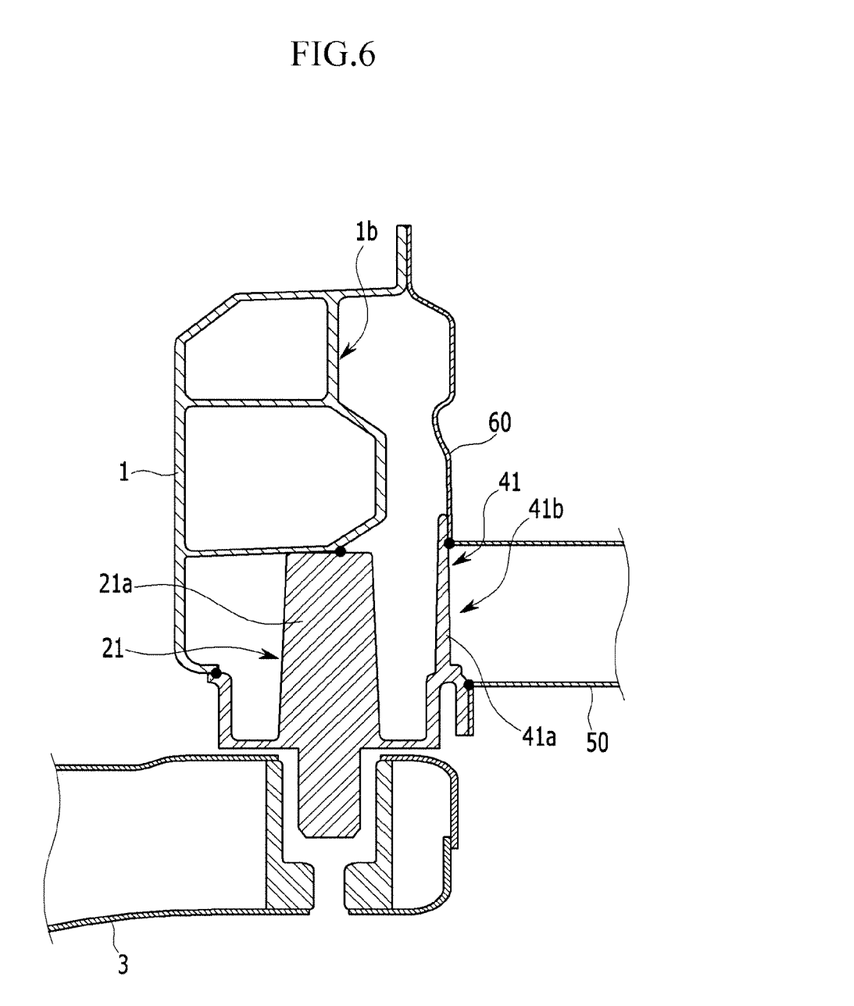
FIG. 6 is a cross-sectional view of a side member assembly unit to which a mounting unit is applied.

FIG. 4 is a projection perspective view of a side member assembly unit to which an exemplary mounting unit is applied. FIG. 5 is an exploded perspective view of a side member assembly unit to which an exemplary mounting unit is applied. FIG. 6 is a cross-sectional view of a side member assembly unit to which an exemplary mounting unit is applied.

FIGS. 4 to 6 show an exemplary mounting unit 20 for connecting a side member 1 to a sub-frame 3 of a vehicle. In an example, a welding seat 10 is formed as a groove on a lower side of the side member 1 and the sub-frame 3 is inserted into the welding seat 10.

The side member 1 may be formed by, for example, a multiplanar aluminum extrusion molding beam. Also, as shown in FIG. 4, a side outer member 60 may be combined with an exterior portion of the side member 1.

As shown in FIG. 5, the welding seat 10 of the side member 1 includes a horizontal welding seat 11 formed by cutting a groove along an internal portion of one side of a lower surface 1a of the side member 1. A vertical welding seat 13 is formed by cutting a groove along an internal portion of one side of an external surface 1b of the side member 1.

Also, as shown in FIG. 5, mounting unit 20 includes a mounting nut 21 for attaching the mounting unit 20 to the side member 1. The mounting unit 21 includes a welding flange 31 and a member seat 41.

The welding flange 31 is disposed around an external circumference of the mounting nut 21 and a head 21a to be inserted into the welding seat 10. The member seat 41 is formed outside the welding flange 31 and may be combined with a fender upper connecting member 50, as shown in FIG. 6.

In this example shown in FIG. 5, the welding flange 31 includes a horizontal flange 31a formed along the external circumference of the mounting nut 21. The horizontal flange 31a can be combined with a horizontal welding seat 11 of the side member 1. Vertical flanges 31b are formed in a vertical direction along the sides of the head 21a of the mounting nut 21. The vertical flanges 31b can be combined with the vertical welding seat 13 of the side member 1.

In addition, the member seat 41 includes a seat flange 41a that extends vertically on an external surface of an upper portion of the horizontal flange 31a of the welding flange 31, and is thus integrated with the horizontal flange 31a. As shown in FIG. 6, the member seat 41b, which is combined with one end of the fender upper connecting member 50, is engraved on a side corresponding to the external surface of the seat flange 41a.

The seat flange 41a has a structure in which a rib R is integrated between the vertical flanges 31b of the welding flange 31 so that stiffness is reinforced.

In the above example, the welding seat 10 may be combined with the welding flange 31 and the member seat 41 may be combined with one end of the fender upper connecting member 50 by welding the individual components together.

Such combinations are performed by line welding along circumferences of the welding seat 10 and the welding flange 31 and circumferences of the member seat 41 and one end of the fender upper connecting member 50.

The type of welding may be, for example, arc welding. However, the present disclosure is not limited thereto and any of various welding techniques suitable for line welding of a welding base metal.

The parts of the mounting unit 20, including the mounting nut 21, the welding flange 31, and the member seat 41, may be integrated with each other by aluminum die-casting molding.

As described above, the welding flange 31 is formed outside the mounting nut 21 of the mounting unit 20 and the welding seat 10 is formed on an internal portion of the lower side of the side member 1. In an example, when the welding flange 31 is laterally inserted into the welding seat 10, a welding joint (not shown) is enlarged before being welded so as to increase the firmness (or decrease the range of motion) in the vertical (up and down) and horizontal (back and forth) directions for the supporting structure.

In addition, one end of the fender upper connecting member 50 may be welded through the member seat 41 formed outside the welding flange 31 of the mounting nut 21 so as to further secure the supporting structure and decrease or suppress any side to side movement of the supporting structure.

In addition, the seat flange 41a of the member seat 41 and the horizontal and vertical flanges 31a and 31b of the welding flange 31 are integrated with each other through the rib R so that the stiffness or rigidity of the combined structure may be reinforced.

As described above, in some implementations, a welding joint of the mounting unit 20 between the side member 1 and the fender upper connecting member 50 is enlarged when the individual components are combined using line welding. This increases the stiffness of the combined structure and mitigates or prevents any horizontal (back and forth and side to side) as well as vertical (up and down) movement. The increased stiffness reduces noise, vibration, and harshness (NVH) and thus, improves driving experience and the performance of a vehicle.

In addition, as the mounting unit 20 is inserted directly into the side member 1 during assembly of the sub-frame structure, the overall assembly process may be simplified and manufacturing or production costs may be reduced. Furthermore, the additional bracket commonly used in conventional sub-frames may be removed, thereby decreasing the total weight of the sub-frame and further reducing costs.

While the disclosed subject matter have been described in connection with exemplary embodiments, it is to be understood that this subject matter is not limited to the particular embodiments described herein, and that the present disclosure is intended to cover various modifications and equivalent arrangements included within the spirit and scope of the following claims.

DESCRIPTION OF SYMBOLS

1: side member
3: sub-frame
10: welding seat
11: horizontal welding seat
13: vertical welding seat
20: mounting unit
21: mounting nut
31: welding flange
41: member seat
50: fender upper connecting member
60: side outer member
R: rib

What is claimed is:

1. A mounting unit for a sub-frame of a vehicle for combining a front side member and the sub-frame,
wherein a welding seat is formed on a lower side of the front side member, and the mounting unit comprises:
a mounting nut assembled with the front side member;
a welding flange disposed around an external circumference of a head of the mounting nut for inserting the welding flange into the welding seat in order to combine the welding flange with the welding seat; and
a member seat that is disposed on an exterior portion of the welding flange for combining the member seat with a fender upper connecting member.

2. The mounting unit of claim 1, wherein the welding seat comprises:
a horizontal welding seat formed as a groove that is cut along an internal portion of one side of a lower surface of the front side member; and
a vertical welding seat formed as a groove that is cut along an internal portion of one side of an external surface of the front side member.

3. The mounting unit of claim 2, wherein the welding flange comprises:
a horizontal flange disposed along an external circumference of the mounting nut to be combined with a horizontal welding seat of the front side member; and
a vertical flange disposed on both sides of a head of the mounting nut in a vertical direction to be combined with a vertical welding seat of the front side member.

4. The mounting unit of claim 1, wherein the member seat is formed using a seat flange in which a second member seat is integrated with an external upper surface of the welding flange and combined with an end portion of the fender upper connecting member, and the second member seat is engraved.

5. The mounting unit of claim 4, wherein the seat flange is connected to the welding flange through a rib integrated between the seat flange and the welding flange.

6. The mounting unit of claim 1, wherein components of the mounting unit are combined by arc welding.

7. The mounting unit of claim 1, wherein components of the mounting unit are combined by line welding along circumferences of the welding seat and the welding flange and circumferences of the member seat and one end of the fender upper connecting member.

8. The mounting unit of claim 1, wherein the front side member is formed by a multiplanar aluminum extrusion molding beam.

9. The mounting unit of claim 1, wherein the mounting nut, the welding flange, and the member seat are integrated with each other by aluminum die-casting molding in the mounting unit.

* * * * *